(12) United States Patent
Zeng et al.

(10) Patent No.: US 10,624,061 B2
(45) Date of Patent: *Apr. 14, 2020

(54) METHOD, APPARATUS, AND SYSTEM FOR REPORTING SERVICE INDICATION MESSAGE

(71) Applicant: Huawei Technologies Co., Ltd., Shenzhen, Guangdong (CN)

(72) Inventors: Qinghai Zeng, Shanghai (CN); Mingzeng Dai, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 140 days.

This patent is subject to a terminal disclaimer.

(21) Appl. No.: 15/460,056

(22) Filed: Mar. 15, 2017

(65) Prior Publication Data
US 2017/0188334 A1    Jun. 29, 2017

Related U.S. Application Data

(63) Continuation of application No. 14/540,898, filed on Nov. 13, 2014, now Pat. No. 9,635,641, which is a
(Continued)

(51) Int. Cl.
*H04W 72/00*   (2009.01)
*H04W 36/00*   (2009.01)
(Continued)

(52) U.S. Cl.
CPC ........... *H04W 72/005* (2013.01); *H04W 8/22* (2013.01); *H04W 24/10* (2013.01);
(Continued)

(58) Field of Classification Search
CPC ............. H04W 36/24; H04W 36/0072; H04W 72/005; H04W 36/0007; H04W 8/22;
(Continued)

(56) References Cited

U.S. PATENT DOCUMENTS 9,392,576 B2   7/2016   Drozt
2007/0054625 A1   3/2007   Beale
(Continued)

FOREIGN PATENT DOCUMENTS

CN   1738486 A   2/2006
CN   1753558 A   3/2006
(Continued)

OTHER PUBLICATIONS

Ericsson et al., "MBMSInterestIndication for connected UEs", Nov. 10-14, 2011, 3GPP, 3GPP TSG-RAN WG2 #76 San Francisco,USA, R2-116190. (Year: 2011).*
(Continued)

*Primary Examiner* — Paul H Masur
*Assistant Examiner* — Michael K Phillips
(74) *Attorney, Agent, or Firm* — Leydig, Voit & Mayer, Ltd.

(57) ABSTRACT

A method and terminal for reporting a Multimedia Broadcast Multicast Service (MBMS) interest indication is provided. The method includes a terminal (having a transmitter) sending an MBMS interest indication to a base station upon a change of priority between an MBMS carrier and a unicast carrier, where the MBMS interest indication includes an MBMS frequency selected by the terminal.

12 Claims, 5 Drawing Sheets

501

A user equipment reports an MBMS interest indication to a base station

Related U.S. Application Data continuation of application No. PCT/CN2012/075463, filed on May 14, 2012.

(51) Int. Cl.

| *H04W 72/04* | (2009.01) |
|---|---|
| *H04W 8/22* | (2009.01) |
| *H04W 24/10* | (2009.01) |
| *H04W 36/24* | (2009.01) |
| *H04L 12/18* | (2006.01) |

(52) U.S. Cl.
CPC ... *H04W 36/0007* (2018.08); *H04W 36/0072* (2013.01); *H04W 72/048* (2013.01); *H04L 12/189* (2013.01); *H04W 36/24* (2013.01)

(58) Field of Classification Search
CPC ... H04W 24/10; H04W 72/048; H04W 72/02; H04W 4/06; H04W 76/40; H04W 48/20; H04W 48/16; H04W 36/0005; H04W 48/18; H04L 12/189; H04L 12/18
See application file for complete search history.

(56) References Cited

U.S. PATENT DOCUMENTS

| 2008/0045224 | A1 | 2/2008 | Lu | |
|---|---|---|---|---|
| 2008/0049663 | A1 | 2/2008 | Voyer | |
| 2008/0112352 | A1 | 5/2008 | Kuo | |
| 2008/0259843 | A1* | 10/2008 | Cai | H04W 36/0007 370/328 |
| 2010/0157969 | A1* | 6/2010 | Swamy | H04W 68/12 370/343 |
| 2011/0070905 | A1 | 3/2011 | Kazmi | |
| 2011/0235565 | A1* | 9/2011 | Wu | H04W 72/005 370/312 |
| 2011/0305183 | A1 | 12/2011 | Hsu et al. | |
| 2012/0039233 | A1 | 2/2012 | Kim | |
| 2012/0236776 | A1* | 9/2012 | Zhang | H04W 48/12 370/312 |
| 2012/0275369 | A1 | 11/2012 | Zhang | |
| 2012/0300732 | A1* | 11/2012 | Ode | H04B 7/022 370/329 |
| 2013/0039248 | A1 | 2/2013 | Koskinen | |
| 2013/0039250 | A1* | 2/2013 | Hsu | H04H 20/71 370/312 |
| 2013/0083715 | A1* | 4/2013 | Etemad | H04W 52/04 370/312 |
| 2013/0114405 | A1* | 5/2013 | Kim | H04W 76/40 370/230 |
| 2013/0242738 | A1* | 9/2013 | Chang | H04W 4/06 370/235 |
| 2013/0258934 | A1* | 10/2013 | Amerga | H04W 72/00 370/312 |
| 2013/0294321 | A1* | 11/2013 | Wang | H04W 4/06 370/312 |
| 2014/0169253 | A1* | 6/2014 | Chun | H04W 72/005 370/312 |
| 2014/0192703 | A1* | 7/2014 | Chun | H04W 76/40 370/312 |

FOREIGN PATENT DOCUMENTS

| CN | 101605377 A | 12/2009 |
|---|---|---|
| CN | 101873533 A | 10/2010 |
| CN | 102149044 A | 8/2011 |
| WO | WO 2012/150498 A1 | 11/2012 |
| WO | WO 2013/023784 A1 | 2/2013 |
| WO | WO 2013/049301 A2 | 4/2013 |

OTHER PUBLICATIONS

Gert, "Method and Apparatus for Selecting Frequency Layer for Connected Mode UE in an MBMS Mobile Communication System", Feb. 22, 2006, CN, CN1738486A, English machine language translation of China patent CN1738486A (Year: 2006).*

Ericsson et al., "MBMS interest indication and RRC signaling details", 3GPP, 3GPP TSG RAN WG2 #77bis, Jeju, South Korea, Mar. 26-30, 2012, R2-121560. (Year: 2012).*

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.1.0 (Mar. 2012), 194 pages.

"Requirement on MBMSInterestIndication message transmission instance w.r.t. UE capability", Alcatel-Lucent, 3GPP TSG-RAN WG2 Meeting #77, Feb. 6-10, 2012, 3 pages, R2-120490.

"Handling of congested MBMS frequecy", Samsung, 3GPP TSG-RAN2#77 bis meeting, Mar. 26-30, 2012, 11 pages, R2-121676.

"MBMS Service Continuity Status Report", Huawei, 3GPP TSG-RAN WG3 Meeting #75, 2 pages, R3-120054.

"Support of MBMS Service Continuity", Huawei, 3GPP TSG-RAN WG3 Meeting #75bis, Mar. 26-30, 2012, 3 pages, R3-120544.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 302 pages.

"MBMS Interest Indication message details", Qualcomm Incorporated, 3GPP TSG-RAN WG2 #78, May 21-25, 2012, 3 pages.

"[77#30]-LTE: MBMS interest indication", LG Electronics Inc., 3GPP TSG-RAN WG2 #77bis, Mar. 26-30, 2012, 10 pages.

"MBMS UE Capability", MediaTek, 3GPP TSG-RAN2 #77bis Meeting, Mar. 26-30, 2012, 3 pages, R2-121112.

"Discussion on UE behaviour if the Interested MBMS is not provided", ITRI, 3GPP TSG-RAN WG2 Meeting #77bis, 3 pages, R2-121532.

"[77#30]-LTE: MBMS interest indication", LG Electronics Inc., 3GPP TSG-RAN WG2 #77bis, Mar. 26-30, 2012, 7 pages.

"Open issues for MBMSInterestIndication", Huawei, HiSilicon, 3GPP TSG-RAN WG2 Meeting #77bis, Mar. 26-30, 2012, 3 pages.

"MBMS interest indication and RRC signaling details", Ericsson, ST-Ericsson, 3GPP TSG-RAN WG2 #77bis, Mar. 26-30, 2012, 9 pages.

"Open issues for MBMSInterestIndication", Huawei, HiSilicon, 3GPP TSG-RAN WG2 Meeting #76, Nov. 14-18, 2011, 4 pages.

\* cited by examiner

METHOD, APPARATUS, AND SYSTEM FOR REPORTING SERVICE INDICATION MESSAGE

CROSS-REFERENCE TO RELATED APPLICATIONS

This application is a continuation of U.S. patent application Ser. No. 14/540,898, filed on Nov. 13, 2014, which is a continuation of International Application No. PCT/CN2012/075463, filed on May 14, 2012, all of the afore-mentioned patent applications are hereby incorporated by reference in their entireties.

TECHNICAL FIELD

The present invention relates to the field of communications technologies, and in particular, to a method, an apparatus, and a system for reporting a service indication message.

BACKGROUND

Currently, a multimedia broadcast/multicast (Multimedia Broadcast Multicast Service, MBMS for short) service is widely applied to a Long Term Evolution (Long Term Evolution, LTE for short) system. Same service data of the broadcast/multicast service can be sent to all users in one or more cells by broadcasting, thereby saving signaling overheads. A user acquires a user service description (User Service Description, USD for short) by using a broadcast/multicast service center (Broadcast Multicast Service Center, BM-SC for short), where the USD includes start time (start time), service duration (duration), and an MBMS service area identifier list (MBMS SAI list) of an MBMS service that can be selected by the user, and one or more frequencies on which the MBMS service is broadcast. The MBMS service area identifier list is used for indicating a broadcast range of the MBMS service.

Currently, a solution for ensuring continuity of an MBMS service is urgently needed in the industry, so as to implement continuity and accuracy of receiving the MBMS service by a user equipment.

SUMMARY

Embodiments of the present invention provide a method, an apparatus, and a system for reporting a service indication message, which can ensure continuity of an MBMS service and improve accuracy of an MBMS handover.

According to one aspect, an embodiment of the present invention provides a method for reporting a service indication message, including:

acquiring, by a base station, in at least one scenario of the following five scenarios, a broadcast/multicast service MBMS interest indication reported by a user equipment, where the MBMS interest indication includes an MBMS frequency selected by the user equipment, or an MBMS frequency and an MBMS service identifier that are selected by the user equipment; and performing, by the base station, an MBMS handover on the user equipment according to the MBMS interest indication, where the MBMS handover is to hand over the user equipment to a cell in which the MBMS frequency is located, where the five scenarios include: when the user equipment receives modified MBMS auxiliary information, in a process in which the user equipment is handed over from a source base station to the base station and after the handover is completed, when a radio resource control protocol RRC of the user equipment is re-established to the base station, when an MBMS service that interests the user equipment ends, and when a carrier configuration of the user equipment is modified, where the MBMS auxiliary information includes an MBMS frequency supported by the base station.

According to another aspect, an embodiment of the present invention further provides a method for reporting a service indication message, including:

reporting, by a user equipment, an MBMS interest indication to a base station in at least one scenario of the following five scenarios, where the five scenarios include: when the user equipment receives modified MBMS auxiliary information, in a process in which the user equipment is handed over from a source base station to the base station and after the handover is completed, when a radio resource control protocol RRC of the user equipment is re-established to the base station, when an MBMS service that interests the user equipment ends, and when a carrier configuration of the user equipment is modified, where the MBMS auxiliary information includes an MBMS frequency supported by the base station, and the MBMS interest indication includes an MBMS frequency selected by the user equipment, or an MBMS frequency and an MBMS service identifier that are selected by the user equipment.

According to another aspect, an embodiment of the present invention further provides a base station, including:

a receiver, configured to acquire, in at least one scenario of the following five scenarios, a broadcast/multicast service MBMS interest indication reported by a user equipment, where the MBMS interest indication includes an MBMS frequency selected by the user equipment, or an MBMS frequency and an MBMS service identifier that are selected by the user equipment; and a processor, configured to perform an MBMS handover on the user equipment according to the MBMS interest indication, where the MBMS handover is to hand over the user equipment to a cell in which the MBMS frequency is located, where the five scenarios include: when the user equipment receives modified MBMS auxiliary information, in a process in which the user equipment is handed over from a source base station to the base station and after the handover is completed, when a radio resource control protocol RRC of the user equipment is re-established to the base station, when an MBMS service that interests the user equipment ends, and when a carrier configuration of the user equipment is modified, where the MBMS auxiliary information includes an MBMS frequency supported by the base station.

According to another aspect, an embodiment of the present invention further provides a user equipment, including:

a transmitter, configured to report an MBMS interest indication to a base station in at least one scenario of the following five scenarios, where the five scenarios include: when the user equipment receives modified MBMS auxiliary information, in a process in which the user equipment is handed over from a source base station to the base station and after the handover is completed, when a radio resource control protocol RRC of the user equipment is re-established to the base station, when an MBMS service that interests the user equipment ends, and when a carrier configuration of the user equipment is modified, where the MBMS auxiliary information includes an MBMS frequency supported by the base station, and the MBMS interest indication includes an MBMS frequency selected by the user equipment, or an MBMS frequency and an MBMS service identifier that are selected by the user equipment.

According to another aspect, an embodiment of the present invention further provides a system for reporting a service indication message, including:

the base station and the user equipment described above.

According to the method, the apparatus, and the system for reporting a service indication message provided by the embodiments of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and continuity of the MBMS service can be ensured.

In accordance with another aspect of the present disclosure, disclosure, there is provided a method for reporting an MBMS interest indication. The method includes sending, by a terminal upon change of priority between MBMS carrier and unicast carrier, the MBMS interest indication to a base station, wherein the MBMS interest indication includes an MBMS frequency selected by the terminal.

In accordance with yet another aspect of the present disclosure, there is provided a terminal including a transmitter configured to send, upon change of priority between an MBMS carrier and a unicast carrier, an MBMS interest indication to a base station, wherein the MBMS interest indication includes an MBMS frequency selected by the terminal.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part of the embodiments of the present invention rather than all of the embodiments. All other embodiments obtained by a person of ordinary skill in the art based on the embodiments of the present invention without creative efforts shall fall within the protection scope of the present invention.

In an MBMS network including a base station that supports an MBMS service and a user equipment that supports an MBMS service, a USD includes service start time (start time), service duration (duration), and an MBMS service area identifier list (MBMS SAI list) of an MBMS service that can be selected by a user, and an MBMS frequency on which the MBMS service is broadcast. The user equipment acquires, from the USD, an MBMS service identifier and an MBMS frequency of an MBMS service that interests the user equipment, and then compares them with MBMS auxiliary information of a base station to which the user equipment belongs, where the MBMS auxiliary information includes an MBMS frequency supported by the base station. Optionally, the user equipment can receive the MBMS service when the MBMS service meets the following three conditions at the same time: the user equipment is interested, the user equipment is capable of receiving the MBMS frequency of the MBMS service, and the base station supports the MBMS frequency of the MBMS service.

Figure 1:
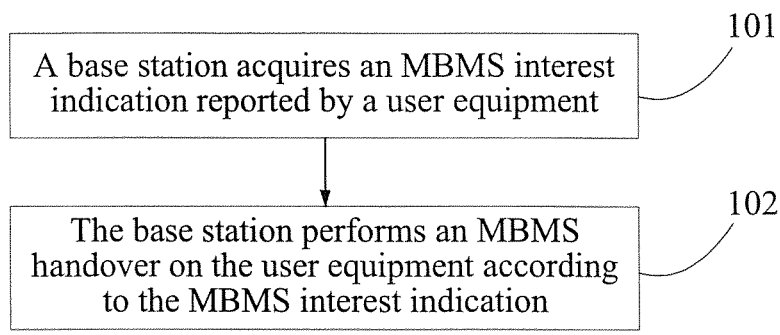
FIG. 1 is a flowchart of a method for reporting a service indication message according to an embodiment of the present invention.

An embodiment of the present invention discloses a method for reporting a service indication message. As shown in FIG. 1, the method includes the following steps:

101: A base station acquires, in any scenario of the following five scenarios, an MBMS interest indication reported by a user equipment.

The MBMS interest indication (MBMS Interest Indication) includes an MBMS frequency reported by the user equipment, or the MBMS interest indication (MBMS Interest Indication) includes an MBMS frequency and an MBMS service identifier that are reported by the user equipment.

The five scenarios include:

(1) when MBMS auxiliary information of the base station is modified, for example, the base station may receive auxiliary information that is modified by an operation, administration and maintenance (Operation, Administration and Maintenance, OAM for short) system or a neighboring cell;

(2) in a process in which the user equipment is handed over to a new base station;

(3) when a radio resource control protocol (Radio Resource Control, RRC for short) of the user equipment is re-established to the base station;

(4) when an MBMS service that interests the user equipment ends; and (5) when a carrier configuration of the user equipment is modified, for example, the base station modifies a connection relationship between a receive radio frequency chain (RF chain) of the user equipment and a primary component carrier of the user equipment, a connection relationship between the receive RF chain and a secondary component carrier of the user equipment, and a connection relationship between the receive RF chain and an MBMS carrier of the user equipment.

The MBMS auxiliary information of the base station includes an MBMS frequency supported by the base station. As described above, the user equipment can receive the MBMS service when the MBMS service meets the following three conditions at the same time: (A) the user equipment is interested, (B) the user equipment is capable of receiving an MBMS frequency of the MBMS service, and (C) the base station supports the MBMS frequency of the MBMS service. That is, the MBMS frequency reported by the user equipment in the MBMS interest indication must be the MBMS frequency corresponding to the MBMS service that interests the user equipment, the MBMS frequency that the user equipment is capable of receiving, and the MBMS frequency included in the MBMS auxiliary information of the base station at the same time. The MBMS service that interests the user equipment (or expressed as an MBMS frequency that interests the user equipment in the following) is an MBMS service customized for the user equipment, or is an MBMS service set by a user and that the user is expected to receive. The MBMS service customized for the user equipment may be an MBMS service pre-customized by an operator for the user equipment. For example, for a user equipment of operator A, an MBMS service of operator A is an MBMS service that interests the user equipment of operator A, and an MBMS service of operator B is an MBMS service that does not interest the user equipment of operator A. The MBMS service that is set by the user and that the user is expected to receive may be an MBMS service received by the user equipment and selected by the user according to a personal preference. Factors affecting a receiving capability of the user equipment include but are not limited to: a range of MBMS frequencies that can be received by the user equipment, a power amplification capability, a power amplification equalization capability, and a baseband processing capability. For definitions of an MBMS service that interests a user and an MBMS service that can be received by a user equipment in subsequent embodiments of the present invention, refer to the foregoing corresponding definitions, which are not repeatedly described in the following.

When any scenario of the foregoing five scenarios occurs, a range of MBMS frequencies that can be selected by the user equipment may be changed. Specifically, in the scenario (1), after the MBMS auxiliary information is modified, a range of MBMS frequencies supported by the base station in the MBMS auxiliary information is changed, which leads to a corresponding change in the range of MBMS frequencies that can be selected by the user equipment. In the scenario (2) and the scenario (3), a range of MBMS frequencies (that is, MBMS auxiliary information) supported by the new base station to which the user equipment is handed over or the RRC is re-established may be different from a range of MBMS frequencies (that is, MBMS auxiliary information) supported by a base station (referred to as a source base station in the following) to which the user equipment belongs before the handover or the RRC re-establishment, or the source base station does not support an MBMS service, which may lead to a corresponding change in the range of MBMS frequencies that can be selected by the user equipment. In addition, after the user equipment is handed over to or the RRC is re-established to the new base station, a frequency on which the user equipment is connected to a cell of the new base station may also be changed, which may lead to a corresponding change in the range of MBMS frequencies (that is, the receiving capability of the user equipment) that can be received by the user equipment, and may also lead to a corresponding change in the range of MBMS frequencies that can be selected by the user equipment. In the scenario (4) and the scenario (5), when a carrier setting of the user equipment is modified, or an MBMS frequency that interests the user equipment needs to be deleted because the MBMS service that interests the user equipment ends, the range of MBMS frequencies (that is, the receiving capability of the user equipment) that can be received by the user equipment is changed, which leads to a corresponding change in the range of MBMS frequencies that can be selected by the user equipment.

A change in the range of MBMS frequencies that can be selected by the user equipment includes: an increase or a decrease in the number of MBMS frequencies supported by the base station in the MBMS auxiliary information, and an increase or a decrease in the number of MBMS frequencies that can be received by the user equipment. When an MBMS frequency supported by the base station (or that can be received by the user equipment) is added, if an MBMS handover is performed on the user equipment according to an original MBMS interest indication, the user equipment cannot receive an MBMS service carried on the newly added MBMS frequency. When some MBMS frequencies supported by the base station (or that can be received by the user equipment) are deleted, if a deleted MBMS frequency is included in the original MBMS interest indication, the MBMS handover is performed on the user equipment according to the original MBMS interest indication, which leads to an MBMS handover error (that is, the MBMS handover cannot be performed on the user equipment to a cell in which the deleted MBMS frequency is located, or the MBMS handover is performed on the user equipment to an irrelevant cell according to the deleted MBMS frequency). Therefore, in the foregoing five scenarios, the original MBMS interest indication is invalid, and the user equipment needs to report the MBMS interest indication again.

It should be noted that, occurrence of the foregoing five scenarios is not a sufficient condition for a change in the range of MBMS frequencies that can be selected by the user equipment. For example, in the scenario (2) or the scenario (3), if MBMS auxiliary information of the source base station is the same as that of the new base station, and the receiving capability of the user equipment remains unchanged after the handover or the RRC re-establishment, the range of MBMS frequencies that can be selected by the user equipment remains unchanged. However, this does not affect reporting of the MBMS interest indication again by the user equipment in the foregoing five scenarios. That is, when the range of MBMS frequencies that can be selected by the user equipment remains unchanged in the foregoing five scenarios, step 101 may also be performed.

102: The base station performs an MBMS handover on the user equipment according to the MBMS interest indication.

Different from the handover in the scenario (2), in this step, the MBMS handover is to hand over the user equipment to a cell in which the MBMS frequency in the MBMS interest indication is located, so that the user equipment receives an MBMS service that interests the user equipment in a corresponding cell.

When the user equipment receives a unicast service and an MBMS service, the base station preferentially performs the MBMS handover on the user equipment to a cell in which the MBMS frequency that interests the user equipment is located, so as to ensure that the user equipment preferentially receives the MBMS service.

In the embodiment of the present invention, the base station is a base station that supports an MBMS service, and in different scenarios, the base station is a base station accessed by a user equipment, and is also a new base station to which the user equipment is handed over or the RRC is re-established.

In an LTE system, if a base station supports continuity of an MBMS service, MBMS auxiliary information is broadcast in system information of a cell in which a user equipment is located, where the MBMS auxiliary information includes an MBMS service area identifier and a frequency, which can be broadcast in the cell and all neighboring cells that support the continuity of the MBMS service, of an MBMS service. A user equipment in an RRC connected state searches a USD for an MBMS service identifier and a service use frequency that correspond to an MBMS service interesting the user equipment, and compares the found MBMS service identifier and service use frequency with the MBMS auxiliary information to determine whether the MBMS service that interests the user equipment can be received in a local cell or a neighboring cell. If the MBMS service that interests the user equipment can be received in the local cell or the neighboring cell, the user equipment reports an MBMS service frequency that interests the user equipment to the base station, so that the base station prefers, during handover determining, the MBMS handover of the user equipment to a cell in which the MBMS frequency is located, so as to ensure that the user equipment continually receives the MBMS service that interests the user equipment. Generally, when the user equipment enters the RRC connected state or a user modifies the MBMS service that interests the user equipment, the user equipment sends an MBMS interest indication to the base station, where an MBMS service frequency that interests the user and can be received is carried in the MBMS interest indication.

When a change in a type or the number of MBMS service frequencies in the MBMS auxiliary information leads to a change in the number of frequencies that can be selected by the user, or when a change in the receiving capability of the user equipment leads to a change in an MBMS service frequency that can be received by the user equipment, the user equipment neither modifies nor reports a new MBMS interest indication. The base station still selects an MBMS handover policy for the user equipment according to an MBMS service frequency in the original MBMS interest indication, which leads to an MBMS handover error.

According to the method for reporting a service indication message provided by the embodiment of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 2:
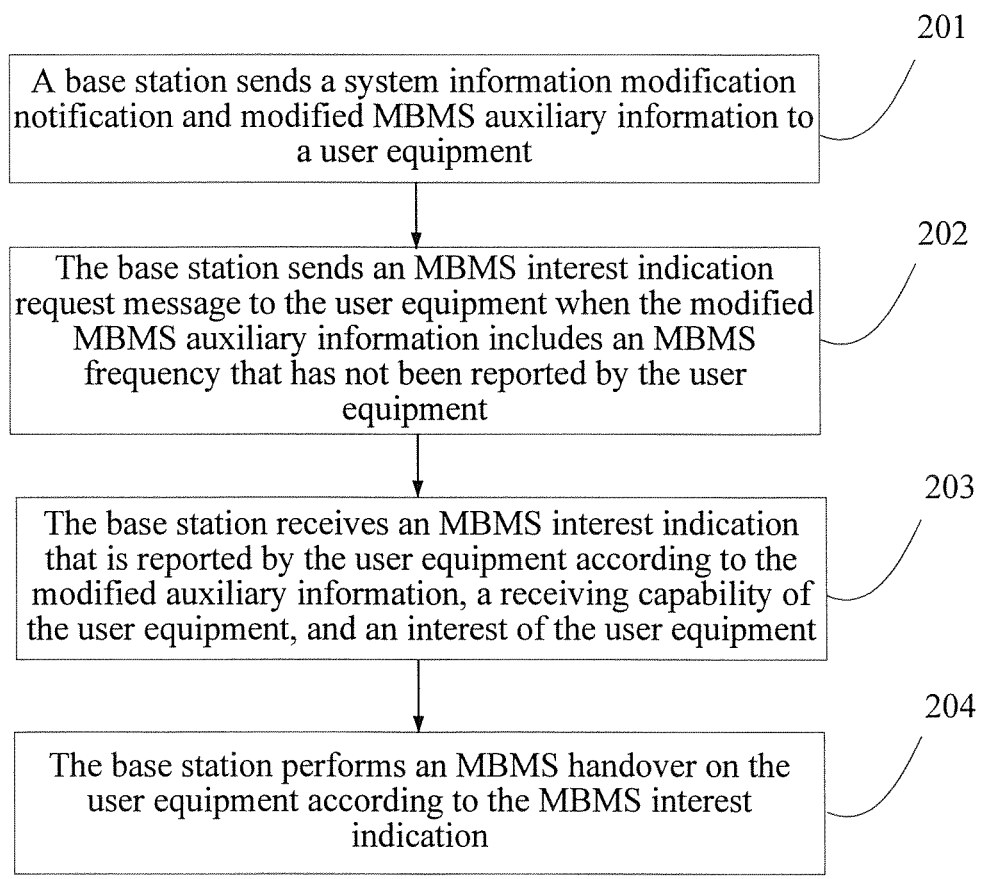
FIG. 2 is a flowchart of a method for reporting a service indication message according to another embodiment of the present invention.

Further, an embodiment of the present invention further provides a method for reporting a service indication message. The method is a further extension of the method embodiment in FIG. 1. For the foregoing scenario (1) to scenario (5), the embodiment of the present invention provides 5 methods for reporting a service indication message:

(1) In the scenario in which the user equipment receives modified MBMS auxiliary information, as shown in FIG. 2, the method includes the following steps:

201: The base station sends a system information modification notification and the modified MBMS auxiliary information to the user equipment.

The base station sends the system information modification notification to the user equipment by using a paging (paging) message, where the system information modification notification is used to inform the user equipment that the MBMS auxiliary information of the base station is modified.

An OAM system or a neighboring cell may modify MBMS auxiliary information in system information of the base station, and add or delete some MBMS frequencies supported by the base station to or from the MBMS auxiliary information. After the MBMS auxiliary information of the base station is modified, the base station sends the system information modification notification to the user equipment by using the paging (paging) message.

202: The base station sends an MBMS interest indication request message to the user equipment when the modified MBMS auxiliary information includes an MBMS frequency that has not been reported by the user equipment.

The base station determines, according to a stored original MBMS interest indication of the user equipment and the modified MBMS auxiliary information, whether the modified MBMS auxiliary information includes the MBMS frequency that has not been reported by the user equipment. The original MBMS interest indication is an MBMS interest indication that is reported by the user equipment before the MBMS auxiliary information of the base station is modified, and MBMS frequencies that have been reported refer to all original MBMS frequencies included in an original MBMS interest indication reported by the user equipment one or more times.

The MBMS interest indication request message is used to request the user equipment to report the MBMS interest indication.

203: The base station receives the MBMS interest indication that is reported by the user equipment according to the modified auxiliary information, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the modified MBMS auxiliary information, so as to obtain the MBMS interest indication.

204: The base station performs the MBMS handover on the user equipment according to the MBMS interest indication.

Figure 3:
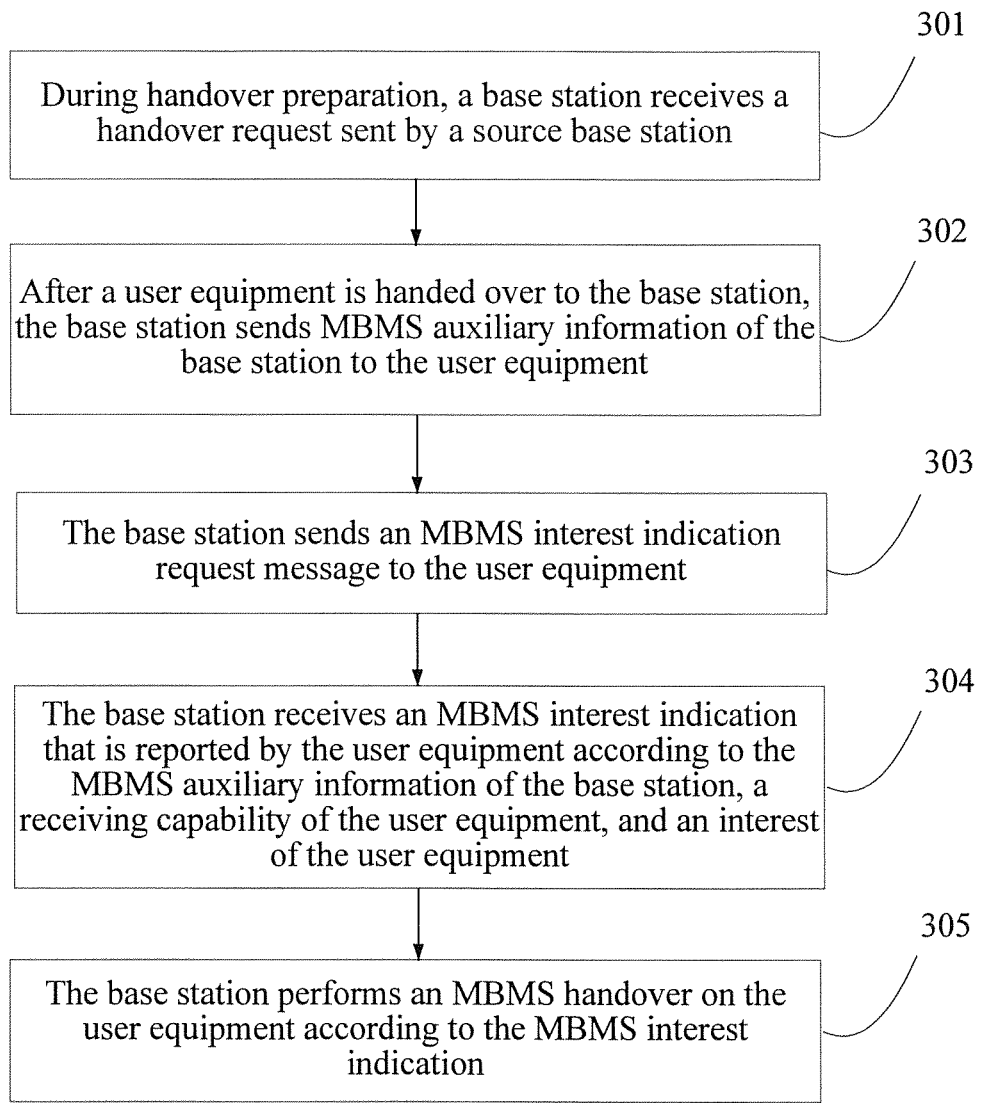
FIG. 3 is a flowchart of another method for reporting a service indication message according to an embodiment of the present invention.

(2) In the process in which the user equipment is handed over from the source base station to the base station, as shown in FIG. 3, the method includes the following steps:

301: During handover preparation, the base station receives a handover request sent by the source base station.

The base station is a new base station except the source base station.

302: After the user equipment is handed over to the base station, the base station sends the MBMS auxiliary information of the base station to the user equipment.

303: The base station sends an MBMS interest indication request message to the user equipment.

The MBMS interest indication request message is used to request the user equipment to report the MBMS interest indication.

When the source base station is a base station that does not support an MBMS service, step 303 is performed.

When the source base station is a base station that supports an MBMS service, specifically:

(1) when the handover request sent by the source base station does not carry an original MBMS interest indication of the user equipment, step 303 is performed, where the original MBMS interest indication is an MBMS interest indication that is reported by the user equipment to the source base station before the handover according to MBMS auxiliary information of the source base station, the receiving capability of the user equipment, and an interest of the user equipment, and the handover request sent by the source base station does not carry the original MBMS interest indication of the user equipment in at least two conditions: (a) the source base station has not received the original MBMS interest indication reported by the user equipment; (b) the source base station has received the original MBMS interest indication reported by the user equipment, but does not add the original MBMS interest indication to the handover request;

(2) when the handover request sent by the source base station carries the original MBMS interest indication of the user equipment, and at least one MBMS frequency in the MBMS auxiliary information of the new base station is excluded from the original MBMS interest indication, step 303 is performed.

For example, the MBMS auxiliary information of the new base station includes three MBMS frequencies: f1, f2, and f3, and the original MBMS interest indication includes two MBMS frequencies: f1 and f2. Because f3 is excluded from the original MBMS interest indication, the new base station performs step 303.

It should be noted that an MBMS frequency that is included in the original MBMS interest indication and excluded from the MBMS auxiliary information of the new base station is not taken into consideration in the condition (2). For example, the original MBMS interest indication includes four MBMS frequencies: f1, f2, f3, and f4. Even though f4 is excluded from the MBMS auxiliary information of the new base station, the original MBMS interest indication includes f1, f2, and f3, and therefore, the new base station does not perform step 303.

304: The base station receives the MBMS interest indication that is reported by the user equipment according to the MBMS auxiliary information of the base station, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

305: The base station performs the MBMS handover on the user equipment according to the MBMS interest indication.

Figure 4:
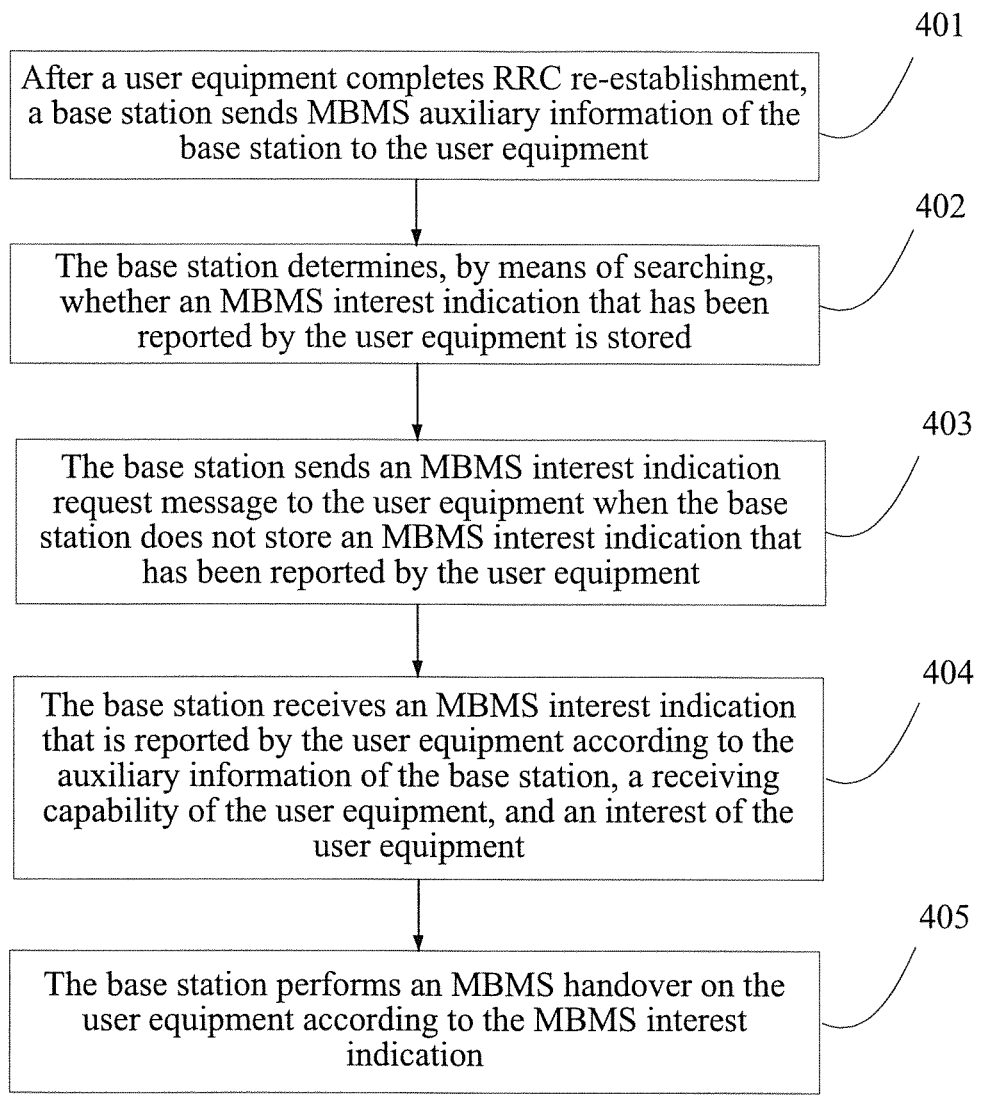
FIG. 4 is a flowchart of still another method for reporting a service indication message according to an embodiment of the present invention.

(3) In the scenario in which the RRC of the user equipment is re-established to the base station, as shown in FIG. 4, the method includes the following steps:

401: After the user equipment completes the RRC re-establishment, the base station sends the MBMS auxiliary information of the base station to the user equipment.

The base station is a new base station except the source base station.

402: The base station determines, by means of searching, whether an MBMS interest indication that has been reported by the user equipment is stored.

The MBMS interest indication that has been reported by the user equipment is an MBMS interest indication that is reported by the user equipment in the source base station and sent by the source base station.

403: The base station sends an MBMS interest indication request message to the user equipment when the base station does not store an MBMS interest indication that has been reported by the user equipment.

The MBMS interest indication request message is used to request the user equipment to report the MBMS interest indication.

404: The base station receives the MBMS interest indication that is reported by the user equipment according to the auxiliary information of the base station, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

405: The base station performs the MBMS handover on the user equipment according to the MBMS interest indication.

(4) In the scenario in which the MBMS service that interests the user equipment ends, the base station receives the MBMS interest indication reported by the user equipment, where the MBMS interest indication is an MBMS interest indication that is reported by the user equipment according to the auxiliary information of the base station, the receiving capability of the user equipment, and an interest of the user equipment.

When the user equipment finds that a session corresponding to the MBMS service that interests the user equipment is deleted from an MBMS control channel (MBMS Control Channel, MCCH for short), and service duration of the MBMS service exceeds service duration of the MBMS service that is described in a USD, the user equipment determines that the MBMS service ends. The user equipment further determines whether another MBMS service that interests the user equipment is carried on an MBMS frequency (a to-be-deleted MBMS frequency) on which the MBMS service is carried. If no other MBMS service that interests the user equipment is carried on the MBMS frequency, the user equipment deletes the to-be-deleted MBMS frequency from the original MBMS interest indication, or deletes, from the original MBMS interest indication, the to-be-deleted MBMS frequency and an MBMS service identifier corresponding to the MBMS service that ends, so as to form a new MBMS interest indication; and then, the user equipment reports the new MBMS interest indication to the base station, and the base station receives the new MBMS interest indication.

(5) In the scenario in which the carrier configuration of the user equipment is modified, with respect to three manners of modifying the carrier configuration, the embodiment of the present invention separately provides the following three manners in which the base station acquires the MBMS interest indication:

(A) When the base station deletes a secondary component carrier of the user equipment, a receive radio frequency chain connected to the secondary component carrier can be connected to an MBMS carrier, so that the receiving capability of the user equipment is improved, and an MBMS service carried on the MBMS carrier can be received. For example, the user equipment has two receive radio frequency chains: c1 and c2, where c1 is used to connect to a unicast primary component carrier of a cell, and c2 is used to connect to a unicast secondary component carrier of the cell. When the user equipment deletes the unicast secondary component carrier from c2, c2 can be used to connect to the MBMS carrier, and the user equipment can receive the MBMS service carried on the MBMS carrier. In this case, the user equipment needs to report the MBMS interest indication to the base station according to the MBMS auxiliary information of the base station, the receiving capability of the user equipment after the secondary component carrier is deleted, and an interest of the user equipment.

(B) When the base station adds a secondary component carrier of the user equipment, a receive radio frequency chain connected to an MBMS carrier needs to connect to the secondary component carrier. Therefore, the receiving capability of the user equipment is reduced, and an MBMS service carried on the MBMS carrier cannot be received. For example, the user equipment has two receive radio frequency chains: c1 and c2, where c1 is used to connect to a unicast primary component carrier of a cell, and c2 is used to connect to the MBMS carrier. After the user equipment adds a unicast secondary component carrier to c2, c2 cannot be used to connect to the MBMS carrier, and the user equipment cannot receive the MBMS service carried on the MBMS carrier. In this case, the user equipment needs to report the MBMS interest indication to the base station according to the MBMS auxiliary information of the base station, the receiving capability of the user equipment after the secondary component carrier is added, and an interest of the user equipment.

(C) When the base station modifies (increases or decreases) a carrier bandwidth of the user equipment, a range of MBMS frequencies that can be carried on an MBMS carrier is changed, which leads to a change in the receiving capability of the user equipment of receiving the MBMS frequency. In this case, the user equipment needs to report the MBMS interest indication to the base station according to the MBMS auxiliary information of the base station, the receiving capability of the user equipment after the carrier bandwidth is modified, and an interest of the user equipment.

There are three modification manners in which the base station modifies the carrier bandwidth of the user equipment, including: modifying a unicast primary component carrier bandwidth, modifying a unicast secondary component carrier bandwidth, and modifying an MBMS carrier bandwidth. Because a total bandwidth of the user equipment remains unchanged, modifications of the unicast primary component carrier bandwidth and the unicast secondary component carrier bandwidth also lead to a change in the MBMS carrier bandwidth, thereby changing the receiving capability of the user equipment.

In the foregoing three manners (A), (B) and (C) of modifying the carrier configuration, that the user equipment reports the MBMS interest indication to the base station according to the auxiliary information of the base station, the receiving capability of the user equipment after the secondary component carrier is deleted, the secondary component carrier is added, or the carrier bandwidth is modified, and an interest of the user equipment is specifically that: the user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment after the secondary component carrier is deleted, the secondary component carrier is added, or the carrier bandwidth is modified, and then further searches the MBMS frequencies that can be received according to the receiving capability of the user equipment for the MBMS frequency included in the MBMS auxiliary information of the base station, so as to obtain the MBMS interest indication.

In an application scenario of the embodiment of the present invention, four MBMS frequencies can be received according to the receiving capability of the user equipment: f1, f2, f3, and f4, original MBMS auxiliary information of the base station includes three MBMS frequencies: f1, f2, and f3, and the original MBMS interest indication reported by the user equipment includes three MBMS frequencies: f1, f2, and f3. When the MBMS auxiliary information of the base station is modified to include the three MBMS frequencies: f2, f3, and f4, a new MBMS interest indication reported by the user equipment only includes the three MBMS frequencies: f2, f3, and f4, where f1 is deleted (because modified MBMS auxiliary information does not support f1) from and f4 is added (the modified MBMS auxiliary information can support f4) to the new MBMS interest indication. The base station does not perform an MBMS handover on the user equipment to a wrong cell according to f1 in the original MBMS interest indication, and the user equipment can further select an MBMS service carried on f4.

In another application scenario of the embodiment of the present invention, the user equipment is handed over from the source base station that does not support an MBMS service to the new base station that supports an MBMS service, the MBMS auxiliary information of the new base station includes three MBMS frequencies: f1, f2, and f3, and the receiving capability of the user equipment includes receiving the three MBMS frequencies: f1, f2, and f3; in this way, compared with a case before the handover, the user equipment can select an MBMS service on the three MBMS frequencies: f1, f2, and f3.

In still another application scenario of the embodiment of the present invention, the MBMS auxiliary information of the base station includes three MBMS frequencies: f1, f2, and f3, and the receiving capability of the user equipment is changed from an original capability of receiving the three MBMS frequencies: f1, f2, and f3 to a capability of receiving only the two MBMS frequencies: f2 and f3. In this case, the newly reported MBMS interest indication excludes f1, which can avoid the problem that the base station performs, according to the original MBMS interest indication, the MBMS handover on the user equipment to a cell in which f1 is located, and consequently the user equipment cannot receive an MBMS service carried on f1.

In yet another application scenario of the embodiment of the present invention, before and after the RRC of the user equipment is re-established, both the source base station and the new base station support an MBMS service, both MBMS auxiliary information of the source base station and that of the new base station support three MBMS frequencies: f1, f2, and f3, the three MBMS frequencies can be received according to the receiving capability of the user equipment: f1, f2, and f3, and the receiving capability of the user equipment remains unchanged before and after the RRC re-establishment. After the RRC of the user equipment is re-established to the new base station, the range of MBMS frequencies that can be selected by the user equipment remains unchanged; however, the user equipment may also report the MBMS interest indication to the new base station again, and whether an MBMS frequency included in the newly reported MBMS interest indication is changed is not limited in the application scenario.

In the embodiment of the present invention, an implementation manner in which the user equipment reports the MBMS interest indication to the base station in the foregoing five scenarios is separately described. Further, when at least two scenarios of the foregoing five scenarios occur, implementation may be performed according to the foregoing implementation manners and in combination with a sequence of occurrence of the at least two scenarios. For example, after the RRC of the user equipment is re-established to the new base station, the user equipment reports the MBMS interest indication according to the MBMS auxiliary information of the new base station, the receiving capability of the user equipment, and the interest of the user equipment. After the MBMS interest indication is reported, the MBMS auxiliary information of the new base station is modified, and then the user equipment reports the MBMS interest indication to the new base station again according to modified MBMS auxiliary information of the new base station, the receiving capability of the user equipment, and the interest of the user equipment. Alternatively, after the RRC is re-established to the new base station, the user equipment does not report the MBMS interest indication temporarily, and after the MBMS auxiliary information of the new base station is modified, the user equipment directly reports the MBMS interest indication to the new base station according to the modified MBMS auxiliary information of the new base station, the receiving capability of the user equipment, and the interest of the user equipment. In the embodiment of the present invention, implementation manners based on a permutation and a combination of multiple scenarios in the foregoing five scenarios are not described one by one in detail.

In the embodiment of the present invention, the base station is a base station that supports an MBMS service, and in different scenarios, the base station is a base station accessed by a user equipment, and is also a new base station to which the user equipment is handed over or the RRC is re-established.

According to the method for reporting a service indication message provided by the embodiment of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 5:
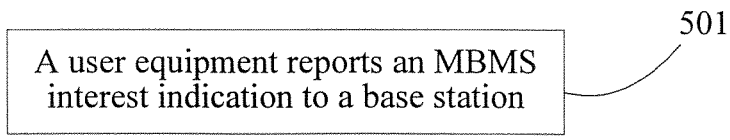
FIG. 5 is a flowchart of a method for reporting a service indication message according to still another embodiment of the present invention.

An embodiment of the present invention provides a method for reporting a service indication message. As shown in FIG. 5, the method includes the following steps:

501: A user equipment reports an MBMS interest indication to a base station in any scenario of the following five scenarios.

The MBMS interest indication includes an MBMS frequency reported by the user equipment, or includes an MBMS frequency and an MBMS service identifier that are reported by the user equipment.

The five scenarios include:

(1) when MBMS auxiliary information of the base station is modified, for example, the base station may receive auxiliary information modified by an OAM system or a neighboring cell;

(2) in a process in which the user equipment is handed over to a new base station;

(3) when RRC of the user equipment is re-established to the base station;

(4) when an MBMS service that interests the user equipment ends; and (5) when a carrier configuration of the user equipment is modified, for example, the base station modifies a connection relationship between a receive radio frequency chain (RF chain) of the user equipment and a primary component carrier of the user equipment, a connection relationship between the receive RF chain and a secondary component carrier of the user equipment, and a connection relationship between the receive RF chain and an MBMS carrier of the user equipment.

The MBMS auxiliary information of the base station includes an MBMS frequency supported by the base station. When any scenario of the foregoing five scenarios occurs, a range of MBMS frequencies that can be selected by the user equipment may be changed. A change in the range of MBMS frequencies that can be selected by the user equipment includes: an increase or a decrease in the number of MBMS frequencies supported by the base station in the MBMS auxiliary information, and an increase or a decrease in the number of MBMS frequencies that can be received by the user equipment. When an MBMS frequency supported by the base station (or that can be received by the user equipment) is added, if an MBMS handover is performed on the user equipment according to an original MBMS interest indication, the user equipment cannot receive an MBMS service carried on the newly added MBMS frequency. When some MBMS frequencies supported by the base station (or that can be received by the user equipment) are deleted, if a deleted MBMS frequency is included in the original MBMS interest indication, the MBMS handover is performed on the user equipment according to the original MBMS interest indication, which leads to an MBMS handover error (that is, the MBMS handover cannot be performed on the user equipment to a cell in which the deleted MBMS frequency is located, or the MBMS handover is performed on the user equipment to an irrelevant cell according to the deleted MBMS frequency). Therefore, in the foregoing five scenarios, the original MBMS interest indication is invalid, and the user equipment needs to report the MBMS interest indication again.

It should be noted that, occurrence of the foregoing five scenarios is not a sufficient condition for a change in the range of MBMS frequencies that can be selected by the user equipment. For example, in the scenario (2) or the scenario (3), if MBMS auxiliary information of a source base station is the same as that of the new base station, and a receiving capability of the user equipment remains unchanged after the handover or the RRC re-establishment, the range of MBMS frequencies that can be selected by the user equipment remains unchanged. However, this does not affect reporting of the MBMS interest indication again by the user equipment in the foregoing five scenarios. That is, when the range of MBMS frequencies that can be selected by the user equipment remains unchanged in the foregoing five scenarios, step 501 may also be performed.

After the user equipment reports the MBMS interest indication to the base station, the base station performs the MBMS handover on the user equipment according to the MBMS interest indication.

Different from the handover in the scenario (2), in this step, the MBMS handover is to hand over the user equipment to a cell in which the MBMS frequency in the MBMS interest indication is located, so that the user equipment receives an MBMS service that interests the user equipment in a corresponding cell. When the user equipment receives a unicast service and an MBMS service, the MBMS handover is performed on the user equipment preferentially to a cell in which an MBMS frequency that interests the user equipment is located, so that the user equipment can preferentially receive the MBMS service.

According to the method for reporting a service indication message provided by the embodiment of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 6:
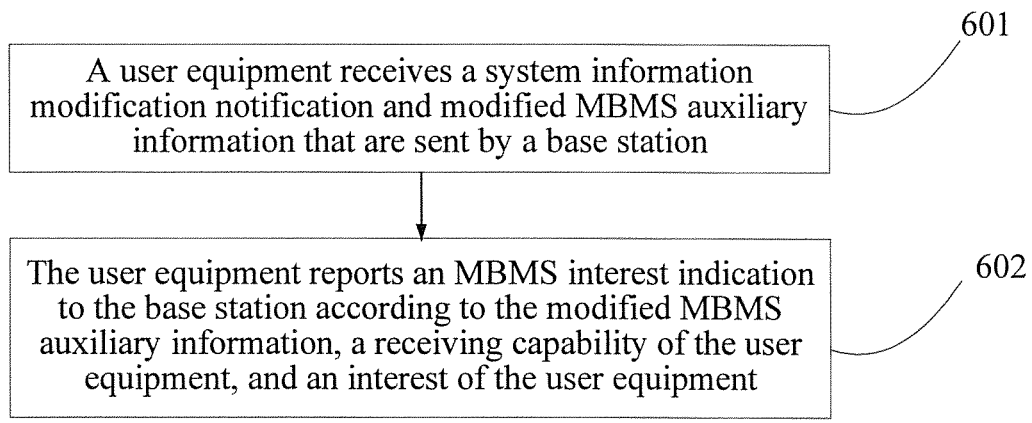
FIG. 6 is a flowchart of a method for reporting a service indication message according to yet another embodiment of the present invention.

Further, an embodiment of the present invention further provides a method for reporting a service indication message. The method is a further extension of the method in FIG. 5. For the foregoing scenario (1) to scenario (5), the embodiment of the present invention provides five methods for reporting a service indication message:

(1) In the scenario in which the user equipment receives modified MBMS auxiliary information, as shown in FIG. 6, the method includes the following steps:

601: The user equipment receives a system information modification notification and the modified MBMS auxiliary information that are sent by the base station.

The user equipment receives the system information modification notification by using a paging message, where the system information modification notification is used to inform the user equipment that the MBMS auxiliary information of the base station is modified.

602: The user equipment reports the MBMS interest indication to the base station according to the modified MBMS auxiliary information, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the modified MBMS auxiliary information, so as to obtain the MBMS interest indication.

Figure 7:
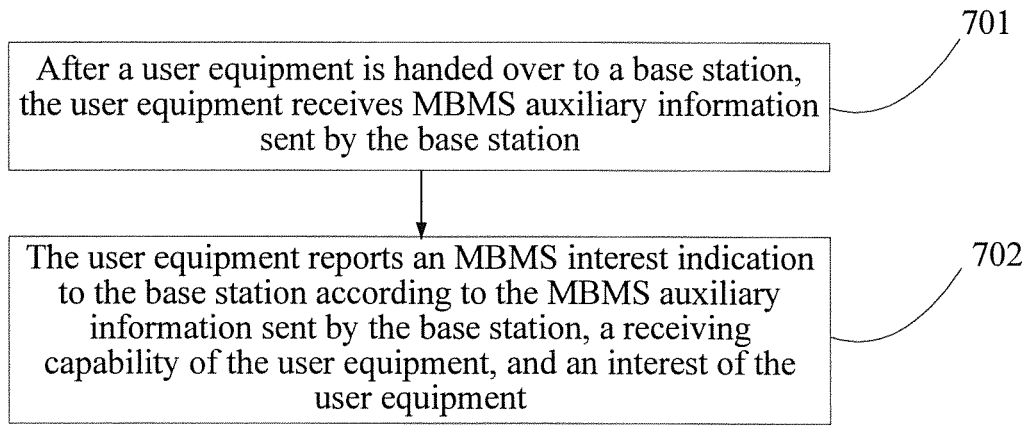
FIG. 7 is a flowchart of another method for reporting a service indication message according to an embodiment of the present invention.

(2) In the process in which the user equipment is handed over from the source base station to the base station, as shown in FIG. 7, the method includes the following steps:

701: After the user equipment is handed over to the base station, the user equipment receives MBMS auxiliary information sent by the base station.

The MBMS auxiliary information is the MBMS auxiliary information of the base station to which the user equipment is handed over, and the base station is a base station except the source base station. The source base station is a base station accessed by the user equipment before the handover.

702: The user equipment reports the MBMS interest indication to the base station according to the MBMS auxiliary information sent by the base station, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

Figure 8:
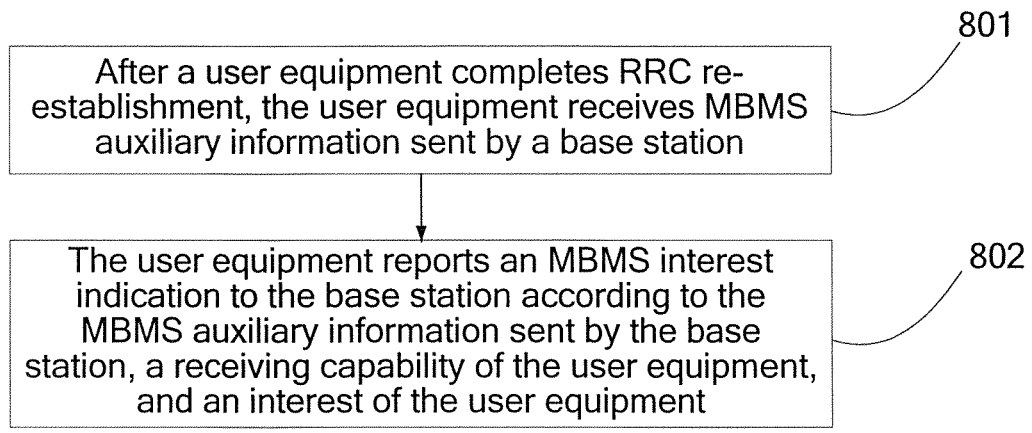
FIG. 8 is a flowchart of still another method for reporting a service indication message according to an embodiment of the present invention.

(3) In the scenario in which the RRC of the user equipment is re-established to the base station, as shown in FIG. 8, the method includes the following steps:

801: After the user equipment completes the RRC re-establishment, the user equipment receives MBMS auxiliary information sent by the base station.

The MBMS auxiliary information is MBMS auxiliary information of a base station accessed by the user equipment after the RRC re-establishment, and the base station is a base station except the source base station. The source base station is a base station accessed by the user equipment before the RRC re-establishment.

802: The user equipment reports the MBMS interest indication to the base station according to the MBMS auxiliary information sent by the base station, the receiving capability of the user equipment, and an interest of the user equipment.

The user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

Optionally, in the scenarios shown in FIG. 6 to FIG. 8, as replacements of step 602, step 702, and step 802, the user equipment may further receive an MBMS interest indication request message sent by the base station, where the MBMS interest indication request message is used to request the user equipment to report the MBMS interest indication, and the user equipment sends the MBMS interest indication to the base station according to the MBMS interest indication request message.

(4) In the scenario in which the MBMS service that interests the user equipment ends, the user equipment reports the MBMS interest indication to the base station, where the MBMS interest indication is an MBMS interest indication that is reported by the user equipment according to the auxiliary information of the base station, the receiving capability of the user equipment, and an interest of the user equipment.

Specifically, when the user equipment finds that a session corresponding to the MBMS service that interests the user equipment is deleted from an MCCH, and service duration of the MBMS service exceeds service duration of the MBMS service that is described in a USD, the user equipment determines that the MBMS service ends. The user equipment further determines whether another MBMS service that interests the user equipment is carried on an MBMS frequency (a to-be-deleted MBMS frequency) on which the MBMS service is carried. If no other MBMS service that interests the user equipment is carried on the MBMS frequency, the user equipment deletes the to-be-deleted MBMS frequency from the original MBMS interest indication, or deletes, from the original MBMS interest indication, the to-be-deleted MBMS frequency and an MBMS service identifier corresponding to the MBMS service that ends, so as to form a new MBMS interest indication; and then, the user equipment reports the new MBMS interest indication to the base station, and the base station receives the new MBMS interest indication.

(5) In the scenario in which the carrier configuration of the user equipment is modified, with respect to three manners of modifying the carrier configuration, the embodiment of the present invention separately provides the following three manners in which the base station acquires the MBMS interest indication:

(A) When the base station deletes a secondary component carrier of the user equipment, a receive radio frequency chain connected to the secondary component carrier can be connected to an MBMS carrier, so that the receiving capability of the user equipment is improved, and an MBMS service carried on the MBMS carrier can be received. For example, the user equipment has two receive radio frequency chains: c1 and c2, where c1 is used to connect to a unicast primary component carrier of a cell, and c2 is used to connect to a unicast secondary component carrier of the cell. When the user equipment deletes the unicast secondary component carrier from c2, c2 can be used to connect to the MBMS carrier, and the user equipment can receive the MBMS service carried on the MBMS carrier. In this case, the user equipment needs to report the MBMS interest indication to the base station according to the MBMS auxiliary information of the base station, the receiving capability of the user equipment after the secondary component carrier is deleted, and an interest of the user equipment.

(B) When the base station adds a secondary component carrier of the user equipment, a receive radio frequency chain connected to an MBMS carrier needs to connect to the secondary component carrier. Therefore, the receiving capability of the user equipment is reduced, and an MBMS service carried on the MBMS carrier cannot be received. For example, the user equipment has two receive radio frequency chains: c1 and c2, where c1 is used to connect to a unicast primary component carrier of a cell, and c2 is used to connect to the MBMS carrier. When the user equipment adds a unicast secondary component carrier to c2, c2 cannot be used to connect to the MBMS carrier, and the user equipment cannot receive the MBMS service carried on the MBMS carrier. In this case, the user equipment needs to report the MBMS interest indication to the base station according to the MBMS auxiliary information of the base station, the receiving capability of the user equipment after the secondary component carrier is added, and an interest of the user equipment.

(C) When the base station modifies (increases or decreases) a carrier bandwidth of the user equipment, a range of MBMS frequencies that can be carried on an MBMS carrier is changed, which leads to a change in the receiving capability of the user equipment of receiving the MBMS frequency. In this case, the user equipment needs to report the MBMS interest indication to the base station according to the MBMS auxiliary information of the base station, the receiving capability of the user equipment after the carrier bandwidth is modified, and an interest of the user equipment.

There are three modification manners in which the base station modifies the carrier bandwidth of the user equipment, including: modifying a unicast primary component carrier bandwidth, modifying a unicast secondary component carrier bandwidth, and modifying an MBMS carrier bandwidth. Because a total bandwidth of the user equipment remains unchanged, modifications of the unicast primary component carrier bandwidth and the unicast secondary component carrier bandwidth also lead to a change in the MBMS carrier bandwidth, thereby changing the receiving capability of the user equipment.

In the foregoing three manners (A), (B) and (C) of modifying the carrier configuration, that the user equipment reports the MBMS interest indication to the base station according to the auxiliary information of the base station, the receiving capability of the user equipment after the secondary component carrier is deleted, the secondary component carrier is added, or the carrier bandwidth is modified, and an interest of the user equipment is specifically that: the user equipment searches a USD for MBMS service identifiers and/or MBMS frequencies corresponding to MBMS services that interest the user equipment, further selects, from selected MBMS service identifiers and/or MBMS frequencies, MBMS frequencies that can be received according to the receiving capability of the user equipment after the secondary component carrier is deleted, the secondary component carrier is added, or the carrier bandwidth is modified, and then further searches the MBMS frequencies that can be received according to the receiving capability of the user equipment for the MBMS frequency included in the MBMS auxiliary information of the base station, so as to obtain the MBMS interest indication.

The application scenarios to which the foregoing embodiment is applicable are also applicable to this embodiment of the present invention. For details, refer to the foregoing application scenarios, which are not described herein again.

Further, when at least two scenarios of the foregoing five scenarios occur, implementation may be performed according to the foregoing implementation manners and in combination with a sequence of occurrence of the at least two scenarios. For example, after the RRC of the user equipment is re-established to the new base station, the user equipment reports the MBMS interest indication according to the MBMS auxiliary information of the new base station, the receiving capability of the user equipment, and the interest of the user equipment. After the MBMS interest indication is reported, the MBMS auxiliary information of the new base station is modified, and then the user equipment reports the MBMS interest indication to the new base station again according to modified MBMS auxiliary information of the new base station, the receiving capability of the user equipment, and the interest of the user equipment. Alternatively, after the RRC is re-established to the new base station, the user equipment does not report the MBMS interest indication temporarily, and after the MBMS auxiliary information of the new base station is modified, the user equipment directly reports the MBMS interest indication to the new base station according to the modified MBMS auxiliary information of the new base station, the receiving capability of the user equipment, and the interest of the user equipment. In the embodiment of the present invention, implementation manners based on a permutation and a combination of multiple scenarios in the foregoing five scenarios are not described one by one in detail.

According to the method for reporting a service indication message provided by the embodiment of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 9:
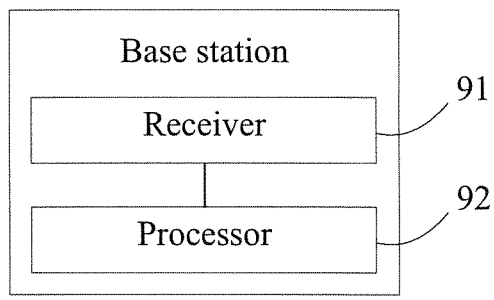
FIG. 9 is a schematic structural diagram of a base station according to an embodiment of the present invention.

An embodiment of the present invention provides a base station, where the base station supports the continuity of an MBMS service. As shown in FIG. 9, the base station includes a receiver 91 and a processor 92.

The receiver 91 is configured to acquire, in any scenario of the following five scenarios, an MBMS interest indication reported by a user equipment.

The MBMS interest indication includes an MBMS frequency reported by the user equipment, or includes an MBMS frequency and an MBMS service identifier that are reported by the user equipment.

The five scenarios include:

(1) when MBMS auxiliary information of the base station is modified, for example, the base station may receive auxiliary information modified by an OAM system or a neighboring cell;

(2) in a process in which the user equipment is handed over to a new base station;

(3) when RRC of the user equipment is re-established to the base station;

(4) when an MBMS service that interests the user equipment ends; and (5) when a carrier configuration of the user equipment is modified, for example, the base station modifies a connection relationship between a receive radio frequency chain (RF chain) of the user equipment and a primary component carrier of the user equipment, a connection relationship between the receive RF chain and a secondary component carrier of the user equipment, and a connection relationship between the receive RF chain and an MBMS carrier of the user equipment.

The processor 92 is configured to perform an MBMS handover on the user equipment according to the MBMS interest indication.

Different from the handover in the scenario (2), in the embodiment of the present invention, the MBMS handover is to hand over the user equipment to a cell in which the MBMS frequency in the MBMS interest indication is located, so that the user equipment receives an MBMS service that interests the user equipment in a corresponding cell.

When the user equipment receives a unicast service and an MBMS service, the processor 92 performs an MBMS handover on the user equipment preferentially to a cell in which an MBMS frequency that interests the user equipment is located, so as to ensure that the user equipment can preferentially receive the MBMS service.

Further, in the scenario in which the user equipment receives modified MBMS auxiliary information, the receiver 91 is specifically configured to:

send a system information modification notification and the modified MBMS auxiliary information to the user equipment.

The receiver 91 sends the system information modification notification to the user equipment by using a paging message, where the system information modification notification is used to inform the user equipment that the MBMS auxiliary information of the base station is modified.

An OAM system or a neighboring cell may modify MBMS auxiliary information in system information of the base station, and add or delete some MBMS frequencies supported by the base station to or from the MBMS auxiliary information. After the MBMS auxiliary information of the base station is modified, the base station sends the system information modification notification to the user equipment by using the paging message.

The receiver 91 sends an MBMS interest indication request message to the user equipment when the modified MBMS auxiliary information includes an MBMS frequency that has not been reported by the user equipment.

The receiver 91 determines, according to a stored original MBMS interest indication of the user equipment and the modified MBMS auxiliary information, whether the modified MBMS auxiliary information includes the MBMS frequency that has not been reported by the user equipment. The original MBMS interest indication is an MBMS interest indication that is reported by the user equipment before the MBMS auxiliary information of the base station is modified, and MBMS frequencies that have been reported refer to all original MBMS frequencies included in an original MBMS interest indication reported by the user equipment one or more times.

The MBMS interest indication request message is used to request the user equipment to report the MBMS interest indication.

The receiver 91 receives the MBMS interest indication that is reported by the user equipment according to the modified auxiliary information, a receiving capability of the user equipment, and an interest of the user equipment.

Further, in the process in which the user equipment is handed over from a source base station to the base station, the receiver 91 is specifically configured to:

during handover preparation, the receiver 91 receives a handover request sent by the source base station, where the base station is a new base station except the source base station.

After the user equipment is handed over to the base station, the receiver 91 sends the MBMS auxiliary information of the base station to the user equipment.

The receiver 91 sends an MBMS interest indication request message to the user equipment, where the MBMS interest indication request message is used to request the user equipment to report the MBMS interest indication.

When the source base station is a base station that does not support an MBMS service, the receiver 91 sends the MBMS interest indication request message to the user equipment.

When the source base station is a base station that supports an MBMS service, specifically:

(1) when the handover request sent by the source base station does not carry an original MBMS interest indication of the user equipment, the receiver 91 sends the MBMS interest indication request message to the user equipment, where the original MBMS interest indication is an MBMS interest indication that is reported by the user equipment to the source base station before the handover according to MBMS auxiliary information of the source base station, a receiving capability of the user equipment, and an interest of the user equipment, and the handover request sent by the source base station does not carry the original MBMS interest indication of the user equipment in at least two conditions:

(a) the source base station has not received the original MBMS interest indication reported by the user equipment;

(b) the source base station has received the original MBMS interest indication reported by the user equipment, but does not add the original MBMS interest indication to the handover request;

(2) when the handover request sent by the source base station carries the original MBMS interest indication of the user equipment, and at least one MBMS frequency in the MBMS auxiliary information of the new base station is excluded from the original MBMS interest indication, the receiver 91 sends the MBMS interest indication request message to the user equipment.

The receiver 91 receives the MBMS interest indication that is reported by the user equipment according to the MBMS auxiliary information of the base station, the receiving capability of the user equipment, and an interest of the user equipment.

Further, in the scenario in which the RRC of the user equipment is re-established to the base station, the receiver 91 is specifically configured to:

after the user equipment completes the RRC re-establishment, the receiver 91 sends the MBMS auxiliary information of the base station to the user equipment.

The receiver 91 searches, by means of searching, whether an MBMS interest indication that has been reported by the user equipment is stored. The receiver 91 sends an MBMS interest indication request message to the user equipment when the base station does not store an MBMS interest indication that has been reported by the user equipment, where the MBMS interest indication request message is used to request the user equipment to report the MBMS interest indication.

The receiver 91 receives the MBMS interest indication that is reported by the user equipment according to the auxiliary information of the base station, a receiving capability of the user equipment, and an interest of the user equipment.

Further, in the scenario in which the MBMS service that interests the user equipment ends, and/or the carrier configuration of the user equipment is modified, the receiver 91 is specifically configured to:

the receiver 91 receives the MBMS interest indication reported by the user equipment, where the MBMS interest indication is an MBMS interest indication that is reported by the user equipment according to the auxiliary information of the base station, a receiving capability of the user equipment, and an interest of the user equipment.

In the embodiment of the present invention, the base station is a base station that supports an MBMS service, and in different scenarios, the base station is a base station accessed by a user equipment, and is also a new base station to which the user equipment is handed over or the RRC is re-established.

The base station provided by the embodiment of the present invention can perform an action of the base station in the foregoing method embodiments, and a user equipment can report an MBMS interest indication to the base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 10:
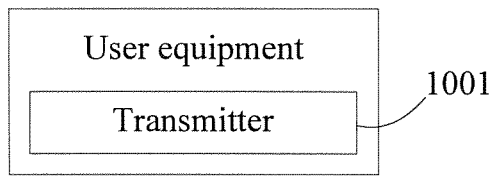
FIG. 10 is a schematic structural diagram of a user equipment according to an embodiment of the present invention.

An embodiment of the present invention provides a user equipment. As shown in FIG. 10, the user equipment includes: a transmitter 1001, configured to report an MBMS interest indication to a base station in any scenario of the following five scenarios.

The MBMS interest indication includes an MBMS frequency reported by the user equipment, or includes an MBMS frequency and an MBMS service identifier that are reported by the user equipment.

The five scenarios include:

(1) when MBMS auxiliary information of the base station is modified, for example, the base station may receive auxiliary information modified by an OAM system or a neighboring cell;

(2) in a process in which the user equipment is handed over to a new base station;

(3) when RRC of the user equipment is re-established to the base station;

(4) when an MBMS service that interests the user equipment ends; and (5) when a carrier configuration of the user equipment is modified, for example, the base station modifies a connection relationship between a receive radio frequency chain (RF chain) of the user equipment and a primary component carrier of the user equipment, a connection relationship between the receive RF chain and a secondary component carrier of the user equipment, and a connection relationship between the receive RF chain and an MBMS carrier of the user equipment.

Further, in the scenario in which the user equipment receives modified MBMS auxiliary information, the transmitter 1001 is specifically configured to:

the transmitter 1001 receives a system information modification notification by using a paging message, where the system information modification notification is used to inform the user equipment that the MBMS auxiliary information of the base station is modified.

The transmitter 1001 reports the MBMS interest indication to the base station according to the modified MBMS auxiliary information, a receiving capability of the user equipment, and an interest of the user equipment.

The transmitter 1001 selects, from a USD, MBMS service identifiers and/or MBMS frequencies corresponding to MBMS services that interest the user equipment, further selects, from the selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the modified MBMS auxiliary information, so as to obtain the MBMS interest indication.

Further, in the process in which the user equipment is handed over from a source base station to the base station, the transmitter 1001 is specifically configured to:

after the user equipment is handed over to the base station, the transmitter 1001 receives MBMS auxiliary information sent by the base station, where the MBMS auxiliary information is the MBMS auxiliary information of the base station to which the user equipment is handed over, the base station is a base station except the source base station, and the source base station is a base station accessed by the user equipment before the handover.

The transmitter 1001 reports the MBMS interest indication to the base station according to the MBMS auxiliary information sent by the base station, a receiving capability of the user equipment, and an interest of the user equipment.

The transmitter 1001 selects, from a USD, MBMS service identifiers and/or MBMS frequencies corresponding to MBMS services that interest the user equipment, further selects, from the selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

Further, in the scenario in which the RRC of the user equipment is re-established to the base station, the transmitter 1001 is specifically configured to:

after the user equipment completes the RRC reestablishment, the transmitter 1001 receives the MBMS auxiliary information sent by the base station, where the MBMS auxiliary information is MBMS auxiliary information of a base station accessed by the user equipment after the RRC reestablishment, the base station is a base station except the source base station, and the source base station is a base station accessed by the user equipment before the RRC reestablishment.

The transmitter 1001 reports the MBMS interest indication to the base station according to the MBMS auxiliary information sent by the base station, a receiving capability of the user equipment, and an interest of the user equipment.

The transmitter 1001 selects, from a USD, MBMS service identifiers and/or MBMS frequencies corresponding to MBMS services that interest the user equipment, further selects, from the selected MBMS service identifiers and/or MBMS frequencies, MBMS frequencies that can be received according to the receiving capability of the user equipment, and then, further searches the MBMS frequencies that can be received according to the receiving capability of the user equipment for the MBMS frequency included in the MBMS auxiliary information of the new base station, so as to obtain the MBMS interest indication.

Further, the transmitter 1001 is further configured to:

receive an MBMS interest indication request message sent by the base station; and report the MBMS interest indication to the base station according to the MBMS interest indication request message.

Further, in the scenario in which the MBMS service that interests the user equipment ends, the transmitter 1001 is specifically configured to:

the transmitter 1001 reports the MBMS interest indication to the base station, where the MBMS interest indication is an MBMS interest indication that is reported by the transmitter 1001 according to the auxiliary information of the base station, a receiving capability of the user equipment, and an interest of the user equipment.

Specifically, when the transmitter 1001 finds that a session corresponding to the MBMS service that interests the user equipment is deleted from an MCCH, and service duration of the MBMS service exceeds service duration of the MBMS service that is described in a USD, the transmitter 1001 determines that the MBMS service ends. The transmitter 1001 further determines whether another MBMS service that interests the user equipment is carried on an MBMS frequency (a to-be-deleted MBMS frequency) on which the MBMS service is carried. If no other MBMS service that interests the user equipment is carried on the MBMS frequency, the transmitter 1001 deletes the to-be-deleted MBMS frequency from the original MBMS interest indication, or deletes, from the original MBMS interest indication, the to-be-deleted MBMS frequency and an MBMS service identifier corresponding to the MBMS service that ends, so as to form a new MBMS interest indication; and then, the transmitter 1001 reports the new MBMS interest indication to the base station, and the base station receives the new MBMS interest indication.

Further, in the scenario in which the carrier configuration of the user equipment is modified, the transmitter 1001 is specifically configured to:

when the base station deletes or adds a secondary component carrier of the user equipment, the transmitter 1001 reports the MBMS interest indication to the base station according to the auxiliary information of the base station, a receiving capability of the user equipment after the secondary component carrier is deleted or added, and an interest of the user equipment.

When the base station modifies a carrier bandwidth of the user equipment, the transmitter 1001 reports the MBMS interest indication to the base station according to the auxiliary information of the base station, a receiving capability of the user equipment after the carrier bandwidth is modified, and the interest of the user equipment.

In the process of reporting the MBMS interest indication, the transmitter 1001 selects, from a USD, MBMS service identifiers and/or MBMS frequencies corresponding to MBMS services that interest the user equipment, further selects, from the selected MBMS service identifiers and/or MBMS frequencies, MBMS frequencies that can be received according to the receiving capability of the user equipment after the secondary component carrier is deleted, the secondary component carrier is added, or the carrier bandwidth is modified, and then, further searches the MBMS frequencies that can be received according to the receiving capability of the user equipment for the MBMS frequency included in the MBMS auxiliary information of the base station, so as to obtain the MBMS interest indication.

The user equipment provided by the embodiment of the present invention can perform an action of the user equipment in the foregoing method embodiments, and the user equipment can report an MBMS interest indication to a base station in scenarios in which MBMS auxiliary information is modified, a handover is performed, RRC re-establishment is performed, an interested MBMS service ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

Figure 11:
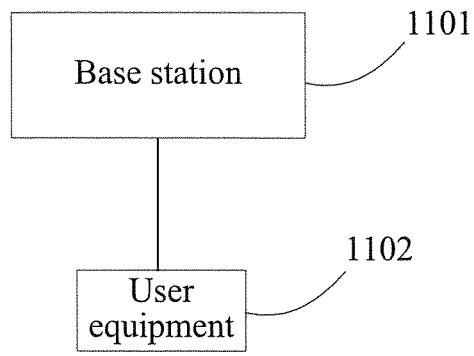
FIG. 11 is a schematic diagram of a system for reporting a service indication message according to an embodiment of the present invention.

An embodiment of the present invention provides a system for reporting a service indication message. As shown in FIG. 11, the system includes: a base station 1101 and a user equipment 1102, where the base station 1101 is configured to acquire, in at least one scenario of the following five scenarios, an MBMS interest indication reported by the user equipment 1102; and the base station 1101 performs an MBMS handover on the user equipment 1102 according to the MBMS interest indication, where the MBMS handover is to hand over the user equipment 1102 to a cell in which an MBMS frequency is located.

The user equipment 1102 is configured to report the MBMS interest indication to the base station 1101 in at least one scenario of the following five scenarios, where the five scenarios include: when the user equipment 1102 receives modified MBMS auxiliary information, in a process in which the user equipment 1102 is handed over from a source base station to the base station 1101, when a radio resource control protocol RRC of the user equipment 1102 is re-established to the base station 1101, when an MBMS service that interests the user equipment 1102 ends, and when a carrier configuration of the user equipment 1102 is modified.

The MBMS auxiliary information includes an MBMS frequency supported by the base station 1101, and the MBMS interest indication includes an MBMS frequency selected by the user equipment 1102, or an MBMS frequency and an MBMS service identifier that are selected by the user equipment 1102.

In the embodiment of the present invention, the base station 1101 is a base station that supports an MBMS service, and the user equipment 1102 is a user equipment that supports an MBMS service. In different scenarios, the base station 1101 is a base station accessed by a user equipment, and is also a new base station to which the user equipment 1102 is handed over or the RRC is re-established.

According to the system for reporting a service indication message provided by the embodiment of the present invention, a user equipment can report an MBMS interest indication to a base station in scenarios in which MBMS auxiliary information is modified, a handover is performed, RRC re-establishment is performed, an MBMS service that interests the user equipment ends, and a carrier configuration is modified; therefore, in the foregoing scenarios, when a range of MBMS frequencies that can be selected is changed, it can be avoided that the base station performs an incorrect MBMS handover on the user equipment according to an original MBMS interest indication, and the continuity of the MBMS service can be ensured.

It may be clearly understood by a person skilled in the art that, for the purpose of convenient and brief description, division of the foregoing function modules is taken as an example for illustration. In an actual application, the foregoing functions can be allocated to different function modules and implemented according to a requirement, that is, an inner structure of an apparatus is divided into different function modules to implement all or a part of the functions described above. For a detailed working process of the foregoing system, apparatus, and unit, reference may be made to a corresponding process in the foregoing method embodiments, and details are not described herein again.

In the several embodiments provided by the present application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for reporting a Multimedia Broadcast Multicast Service (MBMS) interest indication, the method comprising:
   reporting, by a user equipment, the MBMS interest indication to a base station in a scenario in which an MBMS service that interests the user equipment ends, wherein the MBMS service ending corresponds to a service duration of the MBMS service exceeding a service duration of the MBMS service in a user service description (USD);
   wherein the MBMS interest indication comprises an MBMS frequency selected by the user equipment;
   wherein reporting the MBMS interest indication to the base station in the scenario in which the MBMS service that interests the user equipment ends further comprises:
      determining, by the user equipment, whether another MBMS service that interests the user equipment is carried on a to-be-deleted MBMS frequency, wherein the to-be-deleted MBMS frequency is an MBMS frequency on which the MBMS service is carried;
      based on no other MBMS service that interests the user equipment being carried on the to-be-deleted MBMS frequency, deleting, by the user equipment, the to-be-deleted MBMS frequency from an original MBMS interest indication, so as to form the MBMS interest indication; and
      reporting, by the user equipment, the MBMS interest indication to the base station.

2. The method according to claim 1, further comprising:
   receiving, by the user equipment, an MBMS interest indication request message from the base station; and
   wherein reporting the MBMS interest indication to the base station is in accordance with the MBMS interest indication request message.

3. A user equipment, comprising a processor and a non-transitory memory having instructions stored thereon, wherein the processor is configured to execute the instructions to facilitate:
   reporting a Multimedia Broadcast Multicast Service (MBMS) interest indication to a base station in a scenario in which an MBMS service that interests the user equipment ends, wherein the MBMS service ending corresponds to a service duration of the MBMS service exceeding a service duration of the MBMS service in a user service description (USD);
   wherein the MBMS interest indication comprises an MBMS frequency selected by the user equipment;
   wherein reporting the MBMS interest indication to the base station in the scenario in which the MBMS service that interests the user equipment ends further comprises:
      determining whether another MBMS service that interests the user equipment is carried on a to-be-deleted MBMS frequency, wherein the to-be-deleted MBMS frequency is an MBMS frequency on which the MBMS service is carried;
      based on no other MBMS service that interests the user equipment being carried on the to-be-deleted MBMS frequency, deleting the to-be-deleted MBMS frequency from an original MBMS interest indication, so as to form the MBMS interest indication; and
      reporting, by the user equipment, the MBMS interest indication to the base station.

4. The user equipment according to claim 3, wherein the processor is further configured to execute the instructions to facilitate:
   receiving an MBMS interest indication request message from the base station; and
   wherein reporting the MBMS interest indication to the base station is in accordance with the MBMS interest indication request message.

5. A method for reporting a Multimedia Broadcast Multicast Service (MBMS) interest indication, the method comprising:
   reporting, by a user equipment, the MBMS interest indication to a base station in a scenario in which a carrier configuration of the user equipment is modified;
   wherein the MBMS interest indication comprises an MBMS frequency selected by the user equipment;
   wherein reporting the MBMS interest indication to the base station in the scenario in which the carrier configuration of the user equipment is modified further comprises:
      based on the base station deleting or adding a secondary component carrier of the user equipment, reporting, by the user equipment, the MBMS interest indication to the base station according to auxiliary information of the base station, a receiving capability after the secondary component carrier is deleted or added, and an interest of the user equipment; and
      based on the base station modifying a carrier bandwidth of the user equipment, reporting, by the user equipment, the MBMS interest indication to the base station according to the auxiliary information of the base station, a receiving capability of the user equipment after the carrier bandwidth is modified, and the interest of the user equipment.

6. The method according to claim 5, further comprising:
   receiving, by the user equipment, an MBMS interest indication request message from the base station; and
   wherein reporting the MBMS interest indication to the base station is in accordance with the MBMS interest indication request message.

7. A user equipment, comprising a processor and a non-transitory memory having instructions stored thereon, wherein the processor is configured to execute the instructions to facilitate:
   reporting a Multimedia Broadcast Multicast Service (MBMS) interest indication to a base station in a scenario in which a carrier configuration of the user equipment is modified;
   wherein the MBMS interest indication comprises an MBMS frequency selected by the user equipment;
   wherein reporting the MBMS interest indication to the base station in the scenario in which the carrier configuration of the user equipment is modified further comprises:
      based on the base station deleting or adding a secondary component carrier of the user equipment, reporting the MBMS interest indication to the base station according to auxiliary information of the base station, a receiving capability after the secondary component carrier is deleted or added, and an interest of the user equipment; and based on the base station modifying a carrier bandwidth of the user equipment, reporting the MBMS interest indication to the base station according to the auxiliary information of the base station, a receiving capability of the user equipment after the carrier bandwidth is modified, and the interest of the user equipment.

8. The user equipment according to claim 7, wherein the processor is further configured to execute the instructions to facilitate:
   receiving an MBMS interest indication request message from the base station; and
   wherein reporting the MBMS interest indication to the base station is in accordance with the MBMS interest indication request message.

9. A method for reporting a service indication message, the method comprising:
   acquiring, by a base station, a Multimedia Broadcast Multicast Service (MBMS) interest indication reported by a user equipment in a scenario in which the user equipment receives modified MBMS auxiliary information, wherein the modified MBMS auxiliary information comprises an MBMS frequency supported by the base station;
   performing, by the base station, an MBMS handover on the user equipment according to the MBMS interest indication, wherein the MBMS handover is to hand over the user equipment to a cell in which the MBMS frequency is located;
   wherein the MBMS interest indication comprises an MBMS frequency selected by the user equipment;
   wherein acquiring the MBMS interest indication reported by the user equipment in the scenario in which the user equipment receives the modified MBMS auxiliary information further comprises:
      sending, by the base station, a system information modification notification and the modified MBMS auxiliary information to the user equipment, wherein the system information modification notification informs the user equipment that MBMS auxiliary information of the base station is modified;
      sending, by the base station, an MBMS interest indication request message to the user equipment based on the modified MBMS auxiliary information comprising an MBMS frequency that has not been reported by the user equipment; and
      receiving, by the base station, the MBMS interest indication reported by the user equipment according to the modified MBMS auxiliary information, a receiving capability of the user equipment, and an interest of the user equipment.

10. The method according to claim 9, wherein the base station supports an MBMS service.

11. A base station, comprising a processor and a non-transitory memory having instructions stored thereon, wherein the processor is configured to execute the instructions to facilitate:
   acquiring a Multimedia Broadcast Multicast Service (MBMS) interest indication reported by a user equipment in a scenario in which the user equipment receives modified MBMS auxiliary information, wherein the modified MBMS auxiliary information comprises an MBMS frequency supported by the base station;
   performing an MBMS handover on the user equipment according to the MBMS interest indication, wherein the MBMS handover is to hand over the user equipment to a cell in which the MBMS frequency is located;
   wherein the MBMS interest indication comprises an MBMS frequency selected by the user equipment;
   wherein acquiring the MBMS interest indication reported by the user equipment in the scenario in which the user equipment receives the modified MBMS auxiliary information further comprises:
      sending a system information modification notification and the modified MBMS auxiliary information to the user equipment, wherein the system information modification notification informs the user equipment that MBMS auxiliary information of the base station is modified;
      sending an MBMS interest indication request message to the user equipment based on the modified MBMS auxiliary information comprising an MBMS frequency that has not been reported by the user equipment; and
      receiving the MBMS interest indication reported by the user equipment according to the modified MBMS auxiliary information, a receiving capability of the user equipment, and an interest of the user equipment.

12. The base station according to claim 11, wherein the base station supports an MBMS service.

* * * * *